United States Patent [19]

Pinsley et al.

[11] 4,215,321
[45] Jul. 29, 1980

[54] METHOD FOR OBTAINING HIGH BEAM QUALITY IN A GAS DYNAMIC LASER

[75] Inventors: Edward A. Pinsley, North Palm Beach; Richard A. Schmidtke, Tequesta, both of Fla.

[73] Assignee: United Technologies Corporation, Hartford, Conn.

[21] Appl. No.: 893,906

[22] Filed: Apr. 5, 1978

[51] Int. Cl.$^2$ .............................................. H01S 3/22
[52] U.S. Cl. .............................................. 331/94.5 G
[58] Field of Search ...................... 331/94.5 G, 94.5 D

[56] References Cited

U.S. PATENT DOCUMENTS

| | | | |
|---|---|---|---|
| 3,394,320 | 7/1968 | Medicus | 331/94.5 G |
| 3,633,125 | 1/1972 | Whitehouse | 331/94.5 G |
| 3,671,883 | 6/1972 | Smars | 331/94.5 G |
| 3,860,885 | 1/1975 | McLafferty | 331/94.5 P |
| 3,998,393 | 12/1976 | Petty | 331/94.5 G X |
| 4,000,477 | 12/1976 | Osgerby | 331/94.5 G |

Primary Examiner—James W. Davie
Attorney, Agent, or Firm—Lawrence A. Cavanaugh

[57] ABSTRACT

An apparatus and method for minimizing gas density perturbation within an optical region of a gas dynamic laser to improve the optical quality of the output laser is disclosed. Gas disturbance generators disposed intermediate the throat region of the nozzle and the optical region are adapted for producing a disturbance to the flow to oppose flow density disturbances resulting from shock or expansion waves emanating from the intersection of the ends of the nozzle and side walls. In one embodiment the gas disturbance generator is a protrusion into the gas path. A further embodiment utilizes a jet of gas into the gas path to produce the disturbance. A further embodiment utilizes suction along the side wall to produce the disturbance. The optical quality of the laser energy passing across the gas flow is significantly improved.

6 Claims, 7 Drawing Figures

METHOD FOR OBTAINING HIGH BEAM QUALITY IN A GAS DYNAMIC LASER

BACKGROUND OF THE INVENTION

This invention relates primarily to gas dynamic lasers and more particularly to means for perturbing the flow of gas passing through a supersonic nozzle.

The expansion of a fluid from subsonic to supersonic velocity is common in many fluid flow applications. During such an expansion even the most carefully designed aerodynamic nozzles produce some shock or expansion waves in the divergent section of the nozzle particularly at the extremities of two-dimensional nozzles. When a wave is produced in an expansion nozzle, or any other device, a pressure differential and a density variation of the working fluid results across the wave. A major cause of quality degradation of an output beam from a gas dynamic laser is density variations within the gas passing through the optical cavity produced by a shock-expansion waves emanating from intersections at the end and throat regions of a nozzle and the walls of the gas path channel. Imperfection in the nozzle mounting arrangements, changes in the boundary layer thicknesses along the walls of the gas path in the vicinity of the nozzle throat, secondary flow in the boundary layer along the walls of the nozzles, etc., can generate expansion waves which propagate into the optical cavity producing density variations within the gas passing therethrough which perturbs the phase front of the laser beam and degradates the quality of the output beam.

Various attempts have been made to eliminate the optical distortions in the output beam resulting from these disturbances, but none are considered adequate. One method of compensating for the effects of the optical phase disturbances produced by this density variation is the use of mirrors, capable of being deformed, at the ends of each optical beam pass through the cavity. During operation the surface contours of the mirrors are adjusted to produce an opposite phase disturbance to correct for the density variations. This approach is particularly difficult because of the complexity of the fabrication and maintenance of the mirrors as well as the complexity of controlling the corrections required for each specialized case.

McLafferty in U.S. Pat. No. 3,860,885 filed Mar. 13, 1973 and held with the present application by a common assignee discloses a supersonic expansion nozzle arrangement which is especially useful in high power flowing gas laser systems. The nozzle arrangement comprises a plurality of specially contoured two-dimensional elements which are combined in a staggered array upstream of the optical cavity. Sinch each element produces a characteristic shock and expansion wave pattern that radiates in the downstream direction, the staggered array prevents the individual wave patterns from each nozzle from reinforcing one another and the severity of the phase front variations in the optical cavity is reduced resulting in improvements to the optical quality of the output beam.

SUMMARY OF THE INVENTION

An object of the present invention is to reduce the disturbances to the phase front of a beam of laser radiation produced in a flowing gas laser system having supersonic expansion nozzles.

According to the present invention a gas dynamic laser having a nozzle array formed with a plurality of individual nozzle elements includes means for disturbing the flow of gas passing from the nozzle elements to an optical cavity said means positioned intermediate the nozzle elements and the optical cavity.

A primary feature of the present invention is a flow disturbance generator positioned intermediate the nozzle and the optical cavity, adapted for producing a stronger disturbance to the flow than produced by a shock-expansion wave systems emanating from the intersection of the ends of the nozzles and side walls. The flow disturbance generators are typically located in the vicinity of the throat of the nozzle. Additionally the flow disturbance generators may be located at any point in the supersonic flow intermediate the throat of the nozzle and the optical cavity. In one embodiment the flow disturbance generator is a protrusion adjustably insertable through a wall defining a gas path channel into the gas stream. In a further embodiment the disturbance generator is a pumping means in communication with the gas path channel through an orifice in a wall wherein the pumping means is adapted for injecting a jet of gas into the gas stream. Alternatively the pumping means is adapted for providing suction to the gas stream.

A primary advantage of the present invention is the compensation of density disturbances of the gas within the optical cavity produced by shock-expansion waves emanating from the intersections of the ends of the nozzle and the walls of the laser. Additionally flow density disturbances produced by imperfections in the nozzle mounting arrangements, changes in the thickness of the boundary layer at the walls in the vicinity of the nozzle throat, secondary flow in the boundary layer along the nozzle wall, etc., can be compensated to provide a substantially uniform gas flow through the optical cavity region thereby improving the optical quality of a laser output beam. A further advantage of the present invention is that the flow disturbance generators may be located at any point in the supersonic flow downstream of the nozzle throat. Since the disturbances propagate at the Mach angle, adjustment at any one position along the flow path should suffice to provide adjustments everywhere along the flow path.

The foregoing and other objects, features and advantages of the present invention will become more apparent in the light of the following detailed description of preferred embodiments thereof as discussed and illustrated in the accompanying drawing.

DESCRIPTION OF THE PREFERRED EMBODIMENT

Figure 1:
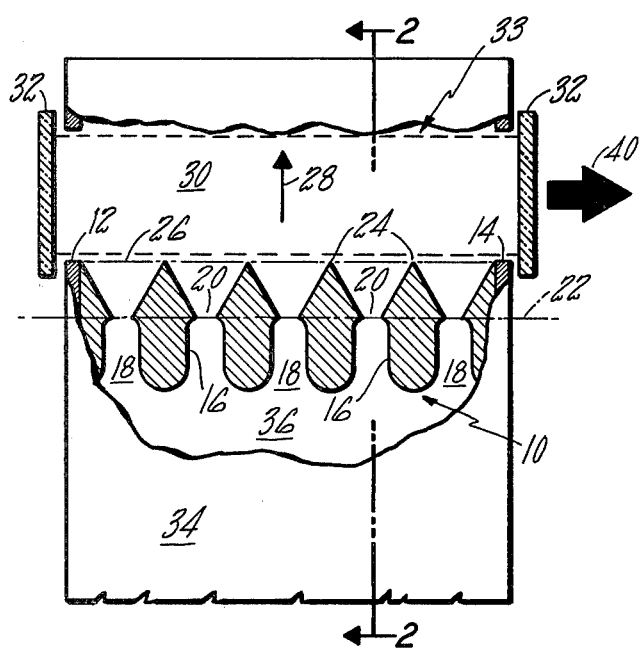
FIG. 1 is a simplified partially broken away schematic top view of the assembly in a typical high power flowing gas laser according to the prior art.

The production of a good quality optical beam from a flowing gas laser requires that the flow conditions of the gain medium be reasonably uniform. Density gradients, particularly those due to shock waves or expansion fans, should be avoided or at least minimized. In many of the prior art flowing gas laser systems a multiple nozzle arrangement, such as shown in FIG. 1, is required to more effectively convert the excitation energy of the gas into laser energy. A nozzle array 10 located between a left side wall 12 and a right side wall 14, has nozzle elements 16 forming parallel flow passages 18 with each pair of adjacent nozzle elements defining a throat region 20. The throat regions of all of the parallel flow passages fall along an essentially straight line 22 which is perpendicular to the side walls 12, 14. Each nozzle element is terminated in a knife-edge 24 and all of the knife-edges are aligned to form a knife-edge plane 26 which is also perpendicular to the side walls 12, 14.

During the operation of the apparatus shown, gas flows through the nozzle array 10 in a direction 28 and passes through an optical region 30 located downstream the nozzle array and defined by resonator mirrors 32. Either of the resonator mirror surfaces may be contoured to form an optical resonator. One of the mirrors may be partially transmissive so that a laser beam can be extracted from the resonator. Alternatively, one of the mirrors may be made smaller in diameter than the other to form a well known "unstable resonator" in which an annular beam is coupled out of the laser cavity. The gas flows through a channel 33 formed by the side walls 12, 14, a front wall 34, and a back wall 36. As the gas expands from a relatively high pressure, subsonic condition upstream of the nozzle to a relatively low pressure supersonic velocity condition downstream of the nozzle, well known aerodynamic effects produce a plurality of shock or expansion waves 38 which emanate from the nozzle wall regions and propagate through the optical region 30 as shown in FIG. 2.

Individual shock or expansion waves often occur from disturbances near the knife-edge and the throat area locations. In addition imperfections in the nozzle mounting arrangements, changes in the boundary layer thickness at the walls in the vicinity of the nozzle throat, secondary flow in the nozzle wall boundary layer of the nozzle walls, etc., can also generate shock and expansion waves which propagate into the optical region and disturb the phase front of radiation oscillating between the mirrors 32. The shock waves are a planar disturbance extending in the downstream direction at substantially the Mach angle for the flow conditions involved. Each wave supports a pressure change in the flowing gas stream and concomitant with the pressure change is a density variation in the flowing gas stream.

In the system described thus far similar waves are often produced between each pair of nozzle elements. Waves are generally produced near the knife-edge and near the throat of the nozzle. Further, each set of waves is aligned with the waves from the adjacent areas so that across the optical region 30 between the side walls 12, 14 the waves under discussion reinforce one another as is apparent from FIG. 2. In a gas laser application in which optical radiation passes through the optical region between the mirrors 32 to produce an output beam 40, the density variations in the gas associated with the waves produce undesirable refraction and diffraction effects in the laser radiation. These refraction and diffraction effects distort the phase front of the optical beam produced by the laser and reduce the peak optical power which can be obtained in the far field when the beam is focused.

Figure 2:
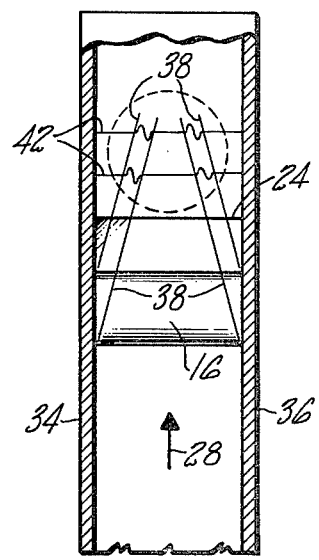
FIG. 2 is a schematic elevation section taken along the line 2—2 of FIG. 1.
Figure 3:
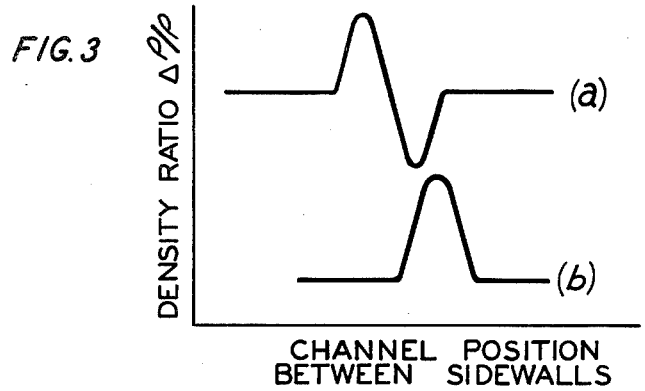
FIG. 3 is a schematic representation of a typical density field variation across the wave system.

A representation of the density field 42 traversed by radiation traveling parallel to the nozzle exit plane at several locations downstream of the nozzle is also shown in FIG. 2. The wave patterns are the result of the contribution from the ends of all nozzle elements of the array and for a well designed device represents the integrated effect of the residual disturbances. Both hot and cold flow experimentation on typical nozzle arrays have shown that the density field across the wave system can have a variety of patterns. FIG. 3 shows two such representative density fields (a) and (b) across the channel between the side walls. In general the wave density pattern is relatively constant along the wave.

Figure 4A:
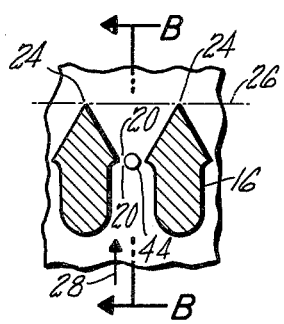
FIG. 4A is a simplified view of a flow disturbance generator positioned between two nozzles.
Figure 4B:
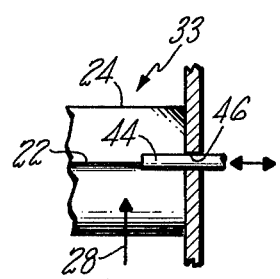
FIG. 4B is a schematic elevation section taken along the line B—B of FIG. 4A.

In the system according to the present invention shown in FIGS. 4A and 4B, provisions are made to disturb the flow generally in the vicinity of the throat region of the nozzles but if required the flow can be disturbed at any point downstream of the throat. Flow disturbance generators adapted for providing a disturbance to the flow greater than and opposite in magnitude to that produced by the effect of the nozzle wall imperfections, etc., are located within the front and/or back walls 34, 36 respectively. FIG. 4A shows a protrusion 44 located in the throat region 20 between two nozzles 16. It is to be recognized that the protrusion may be located anywhere downstream of the throat region including on the knife-edge plane 26. FIG. 4B shows a side view along the direction B—B of FIG. 4A of the protrusion extending through an orifice 46 in the back wall 36 into the gas path channel 33. The protrusion is adapted for removable insertion into the channel. As in FIG. 4A, the protrusion extends into the channel at the nozzle throat.

Figure 5A:
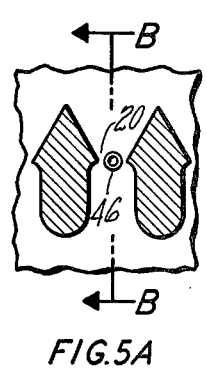
FIG. 5A is a simplified schematic of an embodiment of the present invention.
Figure 5B:
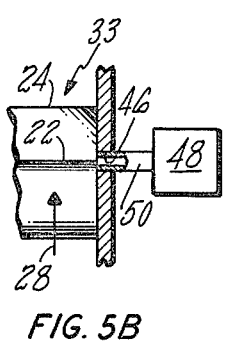
FIG. 5B is a schematic elevation section taken along the line B—B of FIG. 5A.

An embodiment of the present invention is shown in FIGS. 5A and 5B. FIG. 5A shows the orifice 46 located in the back wall at the nozzle throat 20. A pump means 48 as shown in FIG. 5B which is a view along the line B—B of FIG. 5A is connected to a conduit 50 which is inserted in the orifice 46. The pump means as shown in FIG. 5B is adapted for either providing a stream of gas into the channel 33 or of providing a suction to draw gas out of the channel through the orifice. It is to be recognized that the orifice 46 is to be sized and shaped for the particular mode of operation and may include slots. Additionally it is to be recognized that the flow perturbation generators may be located between any and all nozzle elements and that a plurality of generators may be disposed between any pair of nozzles.

In operation, the character of the integrated density disturbance in the optical region is identified by any of the well known techniques for measuring gradients such as schleiren, interferometry, etc. Adjustments are then made to the flow disturbance generators to produce a density disturbance to oppose that of the integrated density field such that the net disturbance is made sufficiently small to reduce the degradation of the optical quality of the output beam. The extent of the adjustments required and the type and location of adjustments can be determined while viewing the flow pattern within the cavity region by schleiren, shadowgraph or interferometric techniques. Since all of the disturbances propagate at the Mach angle, adjustments at any one position along the flow should suffice to provide adjustments anywhere along the wave.

Although this invention has been shown and described with respect to preferred embodiments thereof, it should be understood by those skilled in the art that various changes and omissions in the form and detail thereof may be made therein without departing from the spirit and scope of the invention.

Having thus described typical embodiments of our invention, that which we claim as new and desire to secure by Letters Patent of the United States is:

1. In a flowing gas laser system for the production of an optical beam and including a channel having a flow axis in a direction along which the velocity of a gaseous working medium is increased to permit stimulated emission of radiation from the energy levels of the medium, nozzle means for aerodynamically expanding the medium to supersonic velocity, an optical region for extracting optical power from the flowing gas stream, and means disposed within the nozzle means for perturbing the flow of the gaseous working medium to produce a density disturbance to oppose flow density disturbances produced by shock waves or expansion waves emanating from nozzle-wall intersections.

2. The invention in accordance with claim 1 wherein the means for disturbing the flow of gaseous working medium is a flow disturbance generator positioned in a throat region within the nozzle means.

3. The invention in accordance with claim 1 wherein the means for disturbing the flow of gaseous working medium is a flow disturbance generator disposed within the nozzle means intermediate a throat region of the nozzle means and the optical cavity.

4. In a method for improving the optical quality of a gas dynamic laser employing a nozzle to provide a flowing gaseous gain medium having supersonic velocity, the steps of:
   generating a disturbance in the flowing gas within the nozzle to oppose the flow density disturbances produced by shock-expansion wave systems emanating from the intersection of the nozzle with the walls defining a gas path channel; and
   adjusting the character of the generated disturbance to provide a net flow density disturbance sufficiently small to reduce the degradation of the optical quality of the output beam to a tolerable level.

5. The invention in accordance with claim 4 wherein the disturbance is generated within the nozzle intermediate a throat of the nozzle and an optical region downstream the nozzle.

6. The invention in accordance with claim 5 further including:
   monitoring the flow density disturbances to obtain the characteristics of the flow density disturbances; and
   continuing to monitor the flow density disturbances while generating a disturbance to oppose the flow density disturbances until the net flow density disturbance is sufficiently small to reduce the degradation of the optical quality of the output beam to a tolerable level.

* * * * *